United States Patent [19]

Greene

[11] 4,182,059

[45] Jan. 8, 1980

[54] ROTARY INDEX FOR MOTOR VEHICLE

[76] Inventor: Frank D. Greene, 13730 Polk, Millard, Nebr. 68137

[21] Appl. No.: 871,856

[22] Filed: Jan. 24, 1978

[51] Int. Cl.² ............................................. G09F 9/00
[52] U.S. Cl. ...................................... 40/377; 40/493; 40/593
[58] Field of Search ................ 40/377, 493, 502, 503, 40/506, 114, 593, 594, 348, 19, 360, 10 A, 10 B; 35/77

[56] References Cited

U.S. PATENT DOCUMENTS

| | | | |
|---|---|---|---|
| 593,234 | 11/1897 | McBride | 40/348 |
| 679,462 | 7/1901 | Kennedy et al. | 40/503 |
| 1,520,958 | 12/1924 | Mock | 40/493 X |
| 1,604,914 | 10/1926 | Heebner | 40/348 |
| 2,211,559 | 8/1940 | Erickson | 40/19 |
| 2,617,386 | 11/1952 | Chung et al. | 40/502 X |
| 3,548,524 | 12/1970 | Rohnow | 40/506 |
| 3,564,744 | 2/1971 | Shook | 40/594 |
| 4,021,953 | 5/1977 | Couch | 40/506 |

FOREIGN PATENT DOCUMENTS 702014  1/1965  Canada ...................... 40/506

Primary Examiner—John F. Pitrelli
Assistant Examiner—G. L. Skillington
Attorney, Agent, or Firm—Snider, Sterne & Saidman

[57] ABSTRACT

A rotary index device which is particularly adapted to be mounted on the dashboard of a motor vehicle. The device includes a cylindrical inner member which is rotatingly mounted within an outer cylindrical casing. The inner member has one of a plurality of different information-bearing code sheets secured to the peripheral surface thereof, and the outer casing has a through aperture extending longitudinally along the entire length thereof through which at least one line of the information may be viewed. A magnifying lens is selectively positionable over the through aperture for magnifying the information and facilitating viewing thereof by, for example, the driver of the vehicle. The outer casing may be angularly adjustable with respect to the viewer by a pivotal connection to a mounting bracket which preferably includes an adhesive on the undersurface for securing same to the dashboard of the vehicle. A manually actuable knob extends through one end of the outer casing and has a plurality of teeth which mesh with similar teeth formed on the inner support member for rotating same.

5 Claims, 5 Drawing Figures

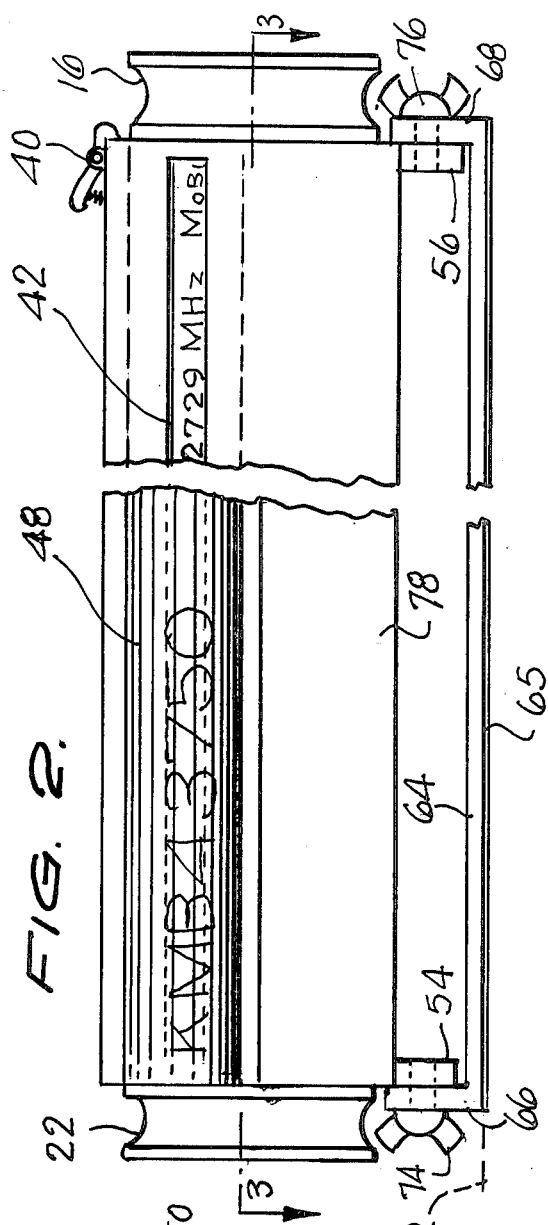
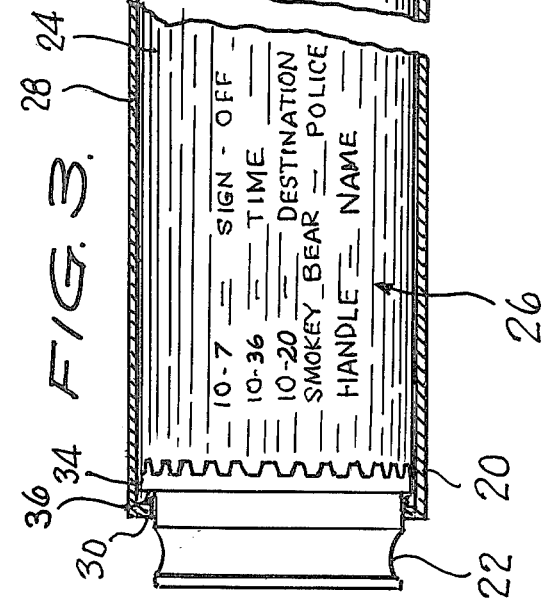
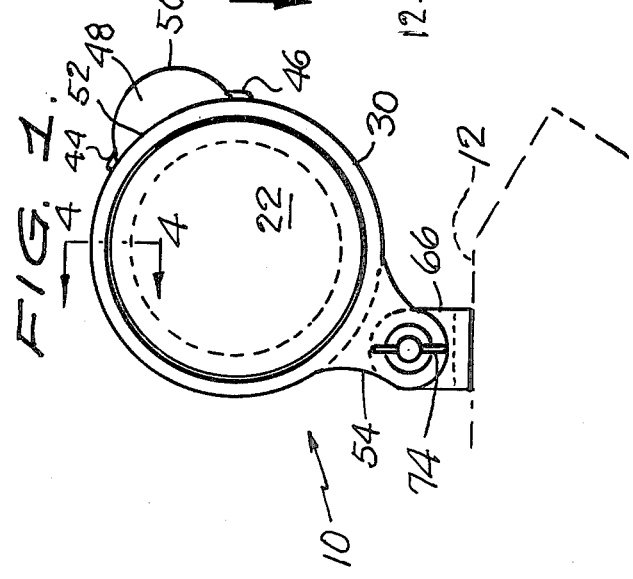
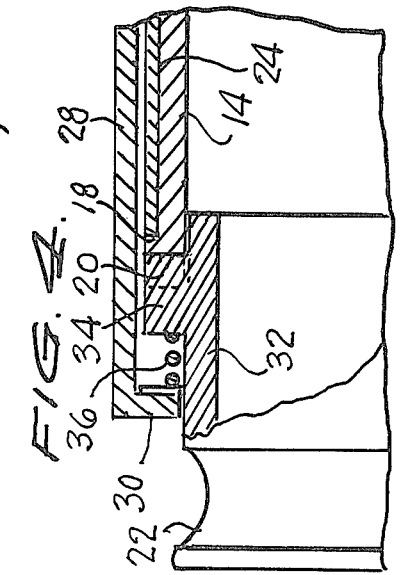

ROTARY INDEX FOR MOTOR VEHICLE

BACKGROUND OF THE INVENTION

1. Field of the Invention

The present invention is related to indexing devices and, more particularly, is directed towards an easy-to-read index device which is particularly adapted to be mounted on the dashboard of a motor vehicle.

2. Description of the Prior Art

Owners of citizen's band (CB) radios must become familiar with an entirely new language which is commonly used on the CB radio channels. For example, "10-4" means "end of message" or "sign-off" in CB jargon. "Handle" means "name", while "Smokey Bear" generally connotes a police car. For a CB operator, especially a novice, the code words utilized on the air basically comprise a foreign language which the enthusiast must master before he can proficiently carry on a conversation with another CB'er.

It would be extremely convenient if a device could be provided which would be readily available and easily observed by the driver of a vehicle, such as a CB operator, which would present, in effect, instantaneous translations of the various code numbers and words utilized on the air. In this manner, the novice could more easily carry on a conversation with an experienced operator. Such a device would also find use among the more experienced operators as a means of recording new information, such as the "handles" of other operators whom they meet on the air. It is towards this end that the present invention is advanced.

Prior art U.S. Pat. Nos. in this general area of which I am aware include: 1,396,553; 1,476,256; 1,667,967; 2,021,934; 2,221,451; 2,747,465; 3,325,933; 3,358,396; and 3,805,429.

OBJECTS AND SUMMARY OF THE INVENTION

It is therefore a primary object of the present invention to provide a new, unique and easy to use rotary index especially adapted to be mounted to the dashboard of a motor vehicle which permits easy visual observation of information therefrom.

Another object of the present invention is to provide a means whereby an operator of a citizen's band (CB) radio can quickly and easily obtain a translation of CB jargon while on the air in order to facilitate his conversion.

A further object of the present invention is to provide a novel and unique rotary index which may be used to transmit information to a viewer, as well as to record information for later viewing.

An additional object of the present invention is to provide a rotary index device which includes means for facilitating the mounting of same to a support surface, such as the dashboard of a vehicle, and means for angularly adjusting the device so as to be more easily read by a viewer.

A still further object of the present invention is to provide a rotary index device which includes selective magnification means for facilitating the viewing of information on a code sheet, and which also features a unit which easily disassembles for changing code sheets.

The foregoing and other objects are attained in accordance with one aspect of the present invention through the provision of a rotary index device adapted to be mounted on a support surface, such as a dashboard of a motor vehicle, which comprises an inner cylindrical support member having turning means positioned at one end thereof and having means for bearing information positioned on the curved surface thereof. The device further includes an outer cylindrical casing within which the inner cylindrical support member is rotatably positioned. The outer casing has a through aperture extending longitudinally therein through which the means for bearing information may be viewed. Means are selectively positionable over the through aperture for magnifying the information, and means are also provided for mounting the outer casing on a support surface which includes means for angularly adjusting the position of the center casing with respect to the support surface.

In accordance with other and more specific aspects of the present invention, the means for mounting the outer casing comprises a mounting bracket connected to the casing and having a substantially planar base on the undersurface of which is formed an adhesive. The means for angularly adjusting the outer casing preferably comprises a pair of mounting flanges extending upwardly from the base of the bracket and having apertures therein, and a pair of cooperating mounting tabs which extend downwardly from the respective ends of the outer casing and having apertures therethrough, and means positioned through corresponding apertures in the mounting flanges and the mounting tabs for securing same in a desired angular relationship. In a preferred embodiment, the securing means comprises a pair of threaded thumbscrews, and the apertures in the mounting tabs are threaded so as to receive the thumbscrews.

In accordance with other more specific aspects of the present invention, the means for magnifying the information comprises a magnifying lens having an arcuate inner surface of substantially the same curvature as the outer surface of the outer casing. The outer casing preferably includes a pair of parallel guide members positioned respectively above and below the through aperture for slidably receiving the magnifying lens therebetween. The through apertures, the magnifying lens and the guide members preferably extend substantially the entire width of the cylindrical outer casing.

In accordance with still other more specific aspects of the present invention, the turning means on the inner cylindrical member comprises a plurality of teeth peripherally formed at one end thereof. A separately formed knob may also be provided which has a plurality of teeth for meshing with the teeth on the inner cylindrical support member. The outer cylindrical casing includes at one end thereof a flange which extends radially inwardly so as to form an opening through which the knob extends. The knob includes a peripheral flange positioned in use inwardly of the flange on the outer casing, and a spring is preferably positioned between the two flanges for tensioning the respective inner and outer cylindrical members. Means are positioned at the other end of the outer casing for retaining the inner member.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a side view illustrating a preferred embodiment of the present invention mounted on the dashboard of a motor vehicle;

FIG. 2 is a front elevational view, partly broken, of the preferred embodiment of the present invention shown in FIG. 1;

FIG. 3 is a partial sectional view of the preferred embodiment illustrated in FIG. 2 and taken along line 3—3 thereof;

FIG. 4 is a partial enlarged sectional view of certain components of the preferred embodiment of the present invention shown in FIG. 1 and taken along line 4—4 thereof.

DETAILED DESCRIPTION OF THE PREFERRED EMBODIMENT

Figure 5:
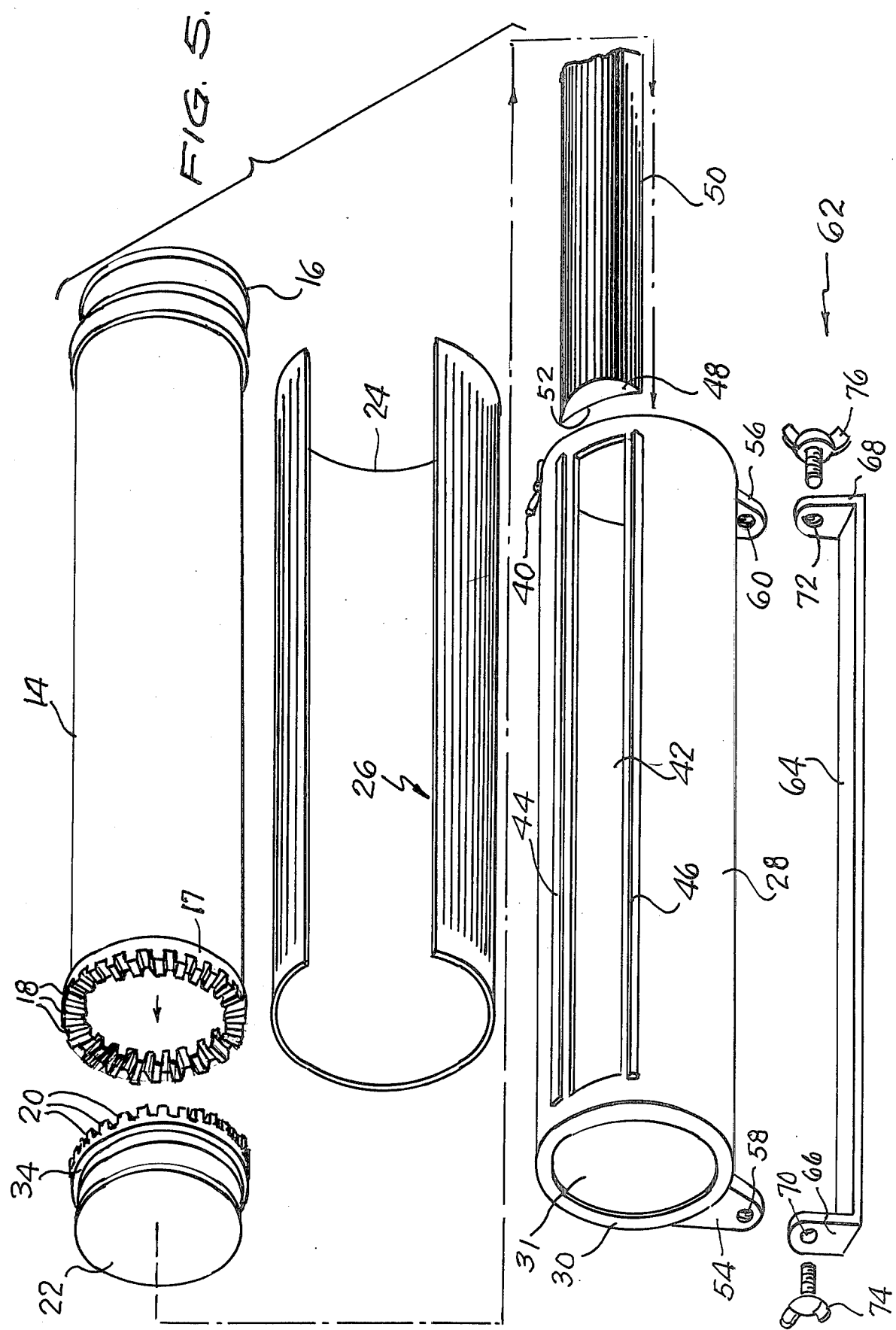
FIG. 5 is an exploded, perspective view which illustrates all of the components which comprise the preferred embodiment of the present invention.

Referring now to the drawings, wherein like reference numerals represent identical or corresponding parts throughout the several views, and more particularly to FIG. 1 thereof, a preferred embodiment of the present invention is indicated generally by reference numeral 10 and is seen to comprise a rotary index which is adapted especially for mounting to the dashboard 12 of a motor vehicle (not shown).

As perhaps best illustrated in FIG. 5, the rotary index 10 comprises an inner cylindrical support member 14 which is preferably formed of clear plastic, such as acrylic or the like. Attached to one end of the inner cylindrical support member 14 is a turning knob 16, while positioned at the other end of support member 14 are turning means 17 comprising a plurality of teeth 18 formed about the circumference of the open end of member 14.

Teeth 18 are adapted to mesh with similarly sized teeth 20 formed on one end of a separate turning knob 22.

FIG. 5 illustrates one code sheet 24, which may consist of paper, plastic, or the like, and which has printed information 26 horizontally disposed in successive lines thereon. Code sheet 24 is adapted to be mounted about inner cylindrical support member 14 by any conventional means. Sheet 24 may bear any type of information. However, in accordance with a preferred embodiment of the present invention, sheet 24 has information thereon which consists of a translation of common citizen's band (CB) language, such as that shown in FIG. 3, for example. The information 26 may also, for example, take the form of short wave call numbers or frequencies, as illustrated in FIG. 2, or may contain mileage information, delivery information, or any other information which the operator or occupant of a motor vehicle may find convenient to have at hand.

Alternatively, portions of the code sheet 24 may be blank so as to permit the operator or occupant of a motor vehicle to record information thereon, as will be described in greater detail hereinafter.

The inner cylindrical support member 14 having the code sheet 24 secured thereto is adapted to be placed within an outer cylindrical casing 28. The outer casing 28 has a flange 30 which extends radially inwardly at one end thereof for defining an opening 31 within which turning knob 22 extends. More particularly, as illustrated in FIG. 4, the knob or handle 22 includes a cylindrical body portion 32 which is sized so as to fit within the flange 30 of casing 28. Extending outwardly from the body portion 32 of knob 22 is a peripheral flange 34 which forms a base for the teeth 20 of the knob 22. A spring 36 is preferably positioned between the flanges 30 and 34 for tensioning the inner cylindrical support member 14 with respect to the outer cylindrical casing 28.

The other end 38 (FIG. 3) of the outer cylindrical casing 28 is also open and is sized to receive the turning means 17 and inner cylindrical support member 14 therewithin. A spring-loaded locking latch 40 (FIGS. 2 and 5) is mounted on the end 38 of outer cylinder 28 so as to maintain the inner cylinder 14 in position within the outer casing 28.

Referring back to FIG. 5, extending substantially the entire length of the outer cylindrical casing 28 is a through aperture 42 which is of a height sufficient so that at least one line of information printed on the code sheet 24 shows therethrough.

Positioned above and below the slot 42 and parallel with respect thereto are a pair of guide flanges 44 and 46 for slidably receiving a magnifying lens 48 therewithin. Lens 48 includes a concave outer surface 50 and an arcuate inner surface 52. The arcuate inner surface 52 of lens 48 has a radius of curvature which is substantially identical to that of the outer surface of the outer cylindrical casing 28 so as to be easily slidable adjacent thereto within guide flanges 44 and 46.

Lens 48 may cover all or a portion of the through slot 42 and acts to magnify any information appearing on the code sheet 24 therebelow. Lens 48 may be easily removed so as to permit the user to record information onto the code sheet 24, if desired.

Means are also provided for adjustably mounting the outer casing 28 so as to facilitate viewing thereof by the operator or occupant of the vehicle. Such means preferably include a pair of mounting tabs 54 and 56 extending from each end of the outer cylindrical casing 28. Tabs 54 and 56 have threaded apertures 58 and 60 formed therein, respectively.

A mounting bracket is indicated generally by reference numeral 62 and includes a substantially planar base 64 the underside of which preferably has an adhesive backing 65 (FIG. 2) preformed thereon. The adhesive 65 may be covered by a paper strip (not shown) so as to facilitate installation of the bracket 62 on the dashboard of a vehicle by simply peeling away the paper strip and pressing the flat base 64 downwardly on the dashboard.

At the respective ends of base 64 are positioned a pair of upwardly extending mounting flanges 66 and 68 having apertures 70 and 72, respectively, for receiving respective thumbscrews 74 and 76. The thumbscrews 74 and 76 are adapted to be threadingly received within threaded apertures 58 and 60 of mounting tabs 54 and 56, respectively, in such a fashion so as to permit the casing 28 to be oriented at a convenient angle to facilitate reading of the information by the operator or occupant of the vehicle.

It may be appreciated by virtue of the foregoing that I have provided a simple, inexpensive and easy to use rotary index which may be easily mounted to the dashboard of a motor vehicle for facilitating conversation by the operator of a citizen's band radio, or the like. For other uses, it may be appreciated that the code sheets 24 may be easily interchanged about inner support member 14 by simply removing the latter from the outer casing 28. This may be accomplished by releasing spring-loaded locking member 40, removing the member 14 via knob 16 and replacing the sheet 14, as desired. The present invention is easily angularly adjustable about the pivot provided by threaded members 74 and 76 so as to further facilitate viewing. The magnification lens permits a large amount of information to be stored on a relatively small unit, and also facilitates the viewing of such information. The magnifying lens may be removed during use to permit handwritten insertion of information on the sheet via the through aperture 42.

Obviously, numerous modifications and variations of the present invention are possible in light of the above teachings. For example, the information may be illuminated from the inside of the device by a simple lamp and battery, or connection to the motor vehicle's electrical system. Therefore, it is to be understood that within the scope of the appended claims, the invention may be practiced otherwise than as specifically described herein.

I claim as my invention:

1. A rotary index device adapted to be mounted on a support surface, such as a dashboard of a motor vehicle, which comprises:
    an inner cylindrical support member having turning means positioned at one end thereof and having means for bearing information positioned on the curved surface thereof;
    an outer cylindrical casing within which said inner cylindrical support member is rotatably positioned and having a through aperture extending longitudinally therein through which said means for bearing information may be viewed;
    means selectively positionable over said through aperture for magnifying said information;
    means for mounting said outer casing on a support surface which includes means for angularly adjusting the position of said outer casing with respect to said support surface;
    wherein said means for mounting said outer casing comprises a mounting bracket connected to said casing and having a substantially planar base on the undersurface of which is formed an adhesive; and
    wherein said means for angularly adjusting said outer casing comprises a pair of mounting flanges extending upwardly from said base of said bracket and having apertures therein, and a pair of cooperating mounting tabs extending downwardly from the respective ends of said outer casing and having apertures therethrough, and means positioned through corresponding apertures in said mounting flanges and said mounting tabs for securing same in a desired angular relationship.

2. The device as set forth in claim 1, wherein said securing means comprises a pair of threaded members, and wherein said apertures in said mounting tabs are threaded to receive said threaded members.

3. A rotary index device adapted to be mounted on a support surface, such as a dashboard of a motor vehicle, which comprises:
    an inner cylindrical support member having turning means positioned at one end thereof and having means for bearing information positioned on the curved surface thereof;
    an outer cylindrical casing within which said inner cylindrical support member is rotatably positioned and having a through aperture extending longitudinally therein through which said means for bearing information may be viewed;
    means selectively positionable over said through aperture for magnifying said information;
    wherein said means for magnifying said information comprises a magnifying lens having an arcuate inner surface of substantially the same curvature as the outer surface of said outer casing; and
    wherein said outer casing includes a pair of parallel guide members positioned respectively above and below said through aperture for slidably receiving said magnifying lens therebetween.

4. The device as set forth in claim 3, wherein said through aperture, said magnifying lens and said guide members extend substantially the entire width of said cylindrical outer casing.

5. A rotary index device adapted to be mounted on a support surface, such as a dashboard of a motor vehicle, which comprises:
    an inner cylindrical support member having turning means positioned at one end thereof and having means for bearing information positioned on the curved surface thereof;
    an outer cylindrical casing within which said inner cylindrical support member is rotatably positioned and having a through aperture extending longitudinally therein through which said means for bearing information may be viewed;
    means selectively positionable over said through aperture for magnifying said information;
    wherein said turning means on said inner cylindrical member comprises a plurality of teeth peripherally formed at one end thereof, and further comprising a separately formed knob having a plurality of teeth for meshing with said teeth on said inner cylindrical member;
    wherein said outer cylindrical casing includes at one end thereof a flange extending radially inwardly which forms an opening through which said knob extends; and
    wherein said knob includes a peripheral flange positioned in use inwardly of said flange on said outer casing, and further comprising spring means positioned between said peripheral flange of said knob and said flange on said outer casing, and means located at the other end of said casing for retaining said inner member within said casing.

* * * * *